United States Patent [19]

Druetzler

[11] Patent Number: 4,560,494
[45] Date of Patent: Dec. 24, 1985

[54] ISOCYANATE FUNCTIONAL PREPOLYMERS AND COATING MATERIALS BASED THEREON

[75] Inventor: Thomas W. Druetzler, Lynwood, Ill.

[73] Assignee: The Sherwin-Williams Company, Cleveland, Ohio

[21] Appl. No.: 686,943

[22] Filed: Dec. 27, 1984

[51] Int. Cl.$^4$ .................. C08G 18/30; C08G 18/75; C08G 18/79

[52] U.S. Cl. ........................ 252/182; 521/116; 521/902; 528/49; 528/59; 528/73; 525/127

[58] Field of Search .................... 528/49, 59, 73; 252/182; 521/902, 116

[56] References Cited

U.S. PATENT DOCUMENTS

| | | | |
|---|---|---|---|
| 2,866,774 | 12/1958 | Price | 260/77.5 |
| 3,012,993 | 12/1961 | Rogan et al. | 260/77.5 |
| 3,272,098 | 9/1966 | Buchholtz et al. | 94/7 |
| 3,483,167 | 12/1969 | Sommer et al. | 260/75 |
| 3,784,503 | 1/1974 | Pregler | 260/33.6 |
| 3,841,895 | 10/1974 | Hick | 260/29.6 |
| 3,871,911 | 3/1975 | Conacher, Jr. | 117/138.8 D |
| 3,875,086 | 4/1975 | Ramey et al. | 260/2.5 |
| 4,020,216 | 4/1977 | Miller | 428/425 |
| 4,154,891 | 5/1979 | Porter, Jr. et al. | 260/29.4 |
| 4,188,472 | 2/1980 | Chang | 528/75 |
| 4,222,911 | 9/1980 | Christenson et al. | 260/22 |
| 4,334,033 | 6/1982 | Metzinger et al. | 521/159 |
| 4,419,293 | 12/1983 | Hudson et al. | 260/453 |
| 4,431,763 | 2/1984 | Reed | 524/389 |
| 4,439,593 | 3/1984 | Kelso et al. | 528/45 |
| 4,451,600 | 5/1984 | Fry | 524/196 |

FOREIGN PATENT DOCUMENTS 082029 7/1973 Japan ................. 521/116

*Primary Examiner*—Herbert S. Cockeram
*Attorney, Agent, or Firm*—Robert E. McDonald; James V. Tura

[57] ABSTRACT

A flexibilizing additive compatible with a wide variety of polymeric vehicles is provided wherein the additive comprises the reaction product of (a) an aliphatic polyisocyanate; (b) at least one monofunctional alcohol containing an ether or carboxyl oxygen; and (c) at least one diol. The flexibilizing additive can be combined with a thermoplastic or thermosetting film-forming vehicle to provide improved coating compositions.

8 Claims, No Drawings

ISOCYANATE FUNCTIONAL PREPOLYMERS AND COATING MATERIALS BASED THEREON

BACKGROUND OF THE INVENTION

1. Field of the Invention

This invention relates to novel isocyanate functional flexibilizing polymers which are compatible with a wide variety of thermoplastic or thermosetting polymeric vehicles including acrylic polymers, nitrocellulose polymers, polyurethane polymers and polyester polymers.

2. Description of the Prior Art

Thermoplastic and thermosetting film-forming vehicles such as acrylic, polyurethane, alkyd, and polyester polymers are well known in the coatings art. These materials have been applied over a variety of substrates and the formulations can be individually varied to optimize desired performance properties. In some applications, however, optimizing one characteristic such as flexibility, can adversely affect other characteristics such as hardness, durability, gloss, etc.

For painting and refinishing of automobiles and trucks a variety of thermosetting and thermoplastic film-forming vehicles are utilized including acrylic lacquers and enamels, nitrocellulose lacquers, alkyd enamels, polyester enamels, and polyurethane enamels. These materials may have sufficient flexibility for application to metal parts but they frequently will not have sufficient flexibility for the more flexible plastic-type materials utilized in automobile and truck bodies. When applied to these flexible materials, the commercial enamels or lacquers may crack, and peel off the flexible materials. Furthermore, since each of the varying enamels and lacquers may have different solvent combinations it is difficult to formulate a single additive which would provide improved flexibility for a wide variety of lacquers and enamels and yet still be compatible with the solvent systems used in such a variety of vehicles.

Prior art teachings relating to flexible compatible additives include U.S. Pat. No. 4,451,600 which describes an additive which involves a mixture of a polyisocyanate, an ester, an ultraviolet light stabilizer and an organic solvent, and U.S. Pat. No. 4,419,293 which teaches modification of a polyisocyanate by reaction with an aliphatic monohydroxy alcohol to provide improved compatability with aliphatic hydrocarbon solvents. None of these systems provide completely adequate improvements in flexibility and compatability.

SUMMARY OF THE INVENTION

This invention involves an isocyanate functional urethane which is especially useful as an additive for coating compositions. If desired, the isocyanate functional urethanes can be used by themselves as moisture curing polymers. Additionally, when used in combination with film-forming polymers having active hydrogen groups the isocyanate functional polymers act as cross-linking agents as well. The isocyanate functional urethanes comprise the reaction product of:

(a) an aliphatic polyisocyanate having an average of at least 2.1 isocyanate groups per molecule and selected from the group consisting of the biurets and isocyanurates of linear aliphatic diisocyanates; and (b) at least one monofunctional alcohol having a molecular weight less than about 500 and which is selected from the group consisting of:

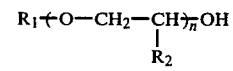

and

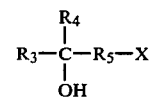

wherein n is from 1 to about 10; $R_1$ is an aliphatic radical of 1 to about 12 carbons; $R_2$ is H or $CH_3$; $R_3$ and $R_4$ are independently aliphatic of 1 to about 12 carbons or H; $R_5$ is an aliphatic radical of 1 to about 8 carbons or nothing;

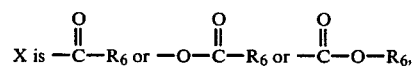

and $R_6$ is an aliphatic radical of 1 to about 12 carbons; and (c) at least one diol having the formula:

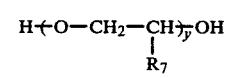

wherein $R_7$ is H or $CH_3$ and y is from 1 to about 40; wherein the total NCO/OH equivalents ratio is greater than 1.0 and the ratio of OH equivalents from (b) to OH equivalents from (c) ranges from 0.3:1 to 2.0:1.0.

This additive is compatible with a wide variety of film-forming vehicles such as thermoplastic or thermosetting acrylic, nitrocellulose, polyurethane, alkyd or polyester polymers to provide coatings having improved flexibility while still maintaining excellent gloss and distinctness of image characteristics in most cases.

It is therefore an object of this invention to provide a novel isocyanate functional urethane. It is another object of this invention to provide coating compositions comprising a thermoplastic or thermosetting vehicle and an effective amount of a flexibilizing isocyanate functional urethane. It is a further object of this invention to provide an isocyanate functional urethane which is compatible with a wide variety of solvents and vehicles. It is a particular object of this invention to provide a coating composition comprising an acrylic lacquer and an isocyanate functional urethane. Another object of this invention is to provide a process for improving the flexibility of thermoplastic and thermosetting film-forming vehicles by the addition of the isocyanate functional urethanes of this invention. These and other objects of the invention will be apparent from the following description.

DETAILED DESCRIPTION OF THE INVENTION

In its most preferred embodiment, the isocyanate functional urethane of this invention comprises the reaction product of:

(a) an aliphatic polyisocyanate selected from the group consisting of the biuret and isocyanurate of hexamethylene diisocyanate; and (b) at least one monofunctional alcohol having a molecular weight less than about 500 and having the structure:

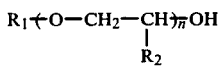

wherein n is from 1 to about 10; $R_1$ is an aliphatic radical of 1 to about 6 carbons; $R_2$ is H or $CH_3$; and (c) at least one diol having the formula:

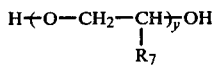

wherein $R_7$ is H or $CH_3$; and Y is from 1 to about 40; wherein the total NCO/OH equivalents ratio is from 1/0.5 to 1/0.99 and the ratio of OH equivalents from (b) to OH equivalents from (c) ranges from 0.5:1 to 2.0:1.

Isocyanates which are useful in the practice of this invention are the aliphatic polyisocyanates having at least an average of 2.1 isocyanate groups per molecule. In particular, the biurets and isocyanurates of linear aliphatic diisocyanates having from 3 to about 20 carbon atoms, such as the biurets and isocyanurates of tetramethylene diisocyanate, pentamethylene diisocyanate, hexamethylene diisocyanate, octamethylene diisocyanate, dodecylmethylene diisocyanate, etc. are especially useful. An especially preferred polyisocyanate is the biuret of hexamethylene diisocyanate having an average of approximately three isocyanate groups per molecule. An especially preferred isocyanurate is the isocyanurate of hexamethylene diisocyanate.

The preparation of the biurets and the isocyanurates can be done by methods well known in the art. The manufacture of biurets from diisocyanates has been taught in U.S. Pat. No. 3,245,941 and the manufacture of the isocyanurates by trimerization of diisocyanates in the presence of a trimerization catalyst has been described in numerous references including U.S. Pat. Nos. 3,487,080; 3,919,218; 4,040,992; 4,288,586; and 4,324,879. The teachings of all these patents is hereby incorporated by reference. The biuret prepared by the reaction of three moles of hexamethylene diisocyanate and one mole of water is commercially available as L-2291 and as Desmodur ® N 100 from the Mobay Company and the isocyanurate of hexamethylene diisocyanate is commercially available as Desmodur ® N-3390 from the Mobay Company. These materials are particularly preferred in the practice of this invention.

An idealized structure for the preferred biuret of hexamethylene diisocyanate is:

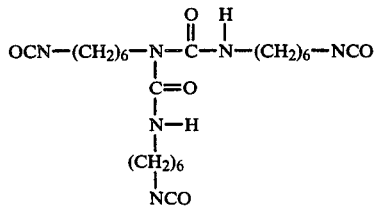

An idealized structure for the preferred isocyanurate of hexamethylene diisocyanate is:

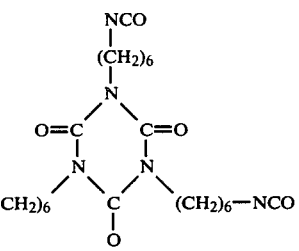

The isocyanate functional urethane of this invention is prepared by reacting the aliphatic polyisocyanate with a combination of at least one monofunctional alcohol and at least one diol. Representative examples of monofunctional alcohols having the structure:

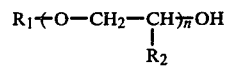

include the alkylene glycol mono-alkyl ethers. The alkylene glycol mono lower-alkyl ethers are especially preferred as the mono functional alcohol in the practice of this invention. These materials are commercially available and are typically prepared by polymerizing propylene oxide and/or ethylene oxide in the presence of a monohydroxy initiator as is well known in the art. Representative examples include ethylene glycol monomethyl ether, ethylene glycol monobutyl ether (butyl cellosolve), propylene glycol monomethyl ether, propylene glycol monoethyl ether, diethylene glycol monobutyl ether (butyl carbitol) tripropylene glycol monobutyl ether and the like. Ethylene glycol monobutyl ether is especially preferred as the monofunctional alcohol in the practice of this invention due to its commercial availability and compatability with many vehicles.

Other useful monofunctional alcohols are those containing, in addition to the hydroxyl group, a ketone or ester linkage. These alcohols have the general formula:

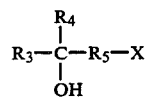

Representative examples of these materials include diacetone alcohol (4-hydroxy-4-methyl-2-pentanone), ethyl lactate, butyl lactate, and 2,2,4-trimethyl-1,3-pentanediol monoisobutyrate. The ester containing materials can be conveniently prepared by methods well known in the art, typically by the reaction of a carboxylic acid with the appropriate epoxy, alcohol or diol and the ketone group containing materials can be conveniently prepared by well known synthetic procedures such as the aldol condensation of ketones in the presence of acidic or basic catalysts.

The diols which are suitable in the practice of this invention include ethylene glycol, diethylene glycol, triethylene glycol, propylene glycol, dipropylene glycol, etc. and have the general formula:

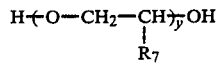

The polypropylene ether glycols and polyethylene ether glycols are conveniently prepared by the reaction of a diol with the corresponding alkylene oxide. These materials are commercially available and may be prepared by a known process such as, for example, the processes discussed in *Encyclopedia of Chemical Technology*, Vol. 7:pp.257–262, published by Interscience Publishers Inc., 1951. An especially preferred diol is Niax Polyol PPG-725 (polypropylene glycol commercially available from Union Carbide having an average hydroxyl number of 147 and a molecular weight of approximately 725).

If desired, mixtures of more than one of the isocyanates, monofunctional alcohols and diols can be used in combination to provide the isocyanate functional urethane product. It is especially preferred to provide a product having a final isocyanate equivalent weight ranging from about 280 to about 4200 based on solids. The ratio of OH equivalents from the monoalcohol to the OH equivalents from the diol can range from 0.3:1 to 2:1 and preferably ranges from 0.5:1 to 2.0:1. Especially preferred is a ratio between 1.0:1 and 2.0:1. In order to insure the product will be isocyanate functional the ratio of total NCO equivalents to total OH equivalents must be greater than 1 and will typically range from 1:0.5 to 1:0.99.

The isocyanate functional urethanes of this invention can be conveniently generated by admixing the required amounts of the aliphatic polyisocyanate, the monofunctional alcohol and the diol and allowing them to react at temperatures ranging typically from at least about 50° F. To shorten the reaction time, the reaction can be conducted at temperatures ranging up to about 200° F. or higher. If desired, low levels, typically less than 1% by weight of the reactants and especially less than 0.1%, of a catalyst for urethane formation, such as dibutyl tin dilaurate, can be added to the reaction mixture. Frequently, it is convenient to generate the isocyanate functional urethane as a solvent solution, typically containing 20–80% solvent, utilizing solvents which are free of active hydrogen atoms such as aromatic hydrocarbons, e.g. xylene, toluene, etc.; ketones such as methyl ethyl ketone, acetone, etc.; esters such as butyl acetate, diethylene glycol monobutyl ether acetate, ethylene glycol monobutyl ether acetate, etc. If desired, in those cases where the isocyanate functional urethane will be blended with a film-forming vehicle which contains no active hydrogen atoms in the vehicle or in any accompanying solvent, the isocyanate functional urethane can be generated in situ by adding the isocyanate, alcohol and diol to the vehicle.

The isocyanate functional urethanes of this invention are especially useful in combination with thermoplastic or thermosetting polymeric vehicles to provide coating compositions having improved flexibility. These coating compositions would typically comprise:

(a) 30–99 parts by weight, and preferably 60–99 parts by weight, of a thermoplastic or thermosetting film-forming polymer vehicle; and (b) 1–70 parts by weight, and preferably 1–40 parts by weight, of the isocyanate functional urethane of this invention. The isocyanate functional urethanes of this invention can be used with any film-forming polymer. Particular examples of the thermosetting and thermoplastic film-forming vehicles include acrylic lacquers and enamels, nitrocellulose lacquers, alkyd enamels, polyester enamels and polyurethane enamels. Methods of preparing these materials are well known in the art.

Acrylic resins useful in combination with the isocyanate functional urethane of this invention to produce coatings may be either of the thermoplastic type, which dry primarily by solvent evaporation, or they may be the thermosetting crosslinking type which contain hydroxyl or amine or other reactive functionality which can be crosslinked. The acrylic addition polymers are typically polymers or copolymers of one or more alkyl esters of acrylic acid or methacrylic acid, optionally together with one or more other ethylenically unsaturated monomers. Suitable acrylic esters for either type of polymer include methyl methacrylate, ethyl methacrylate, propyl methacrylate, butyl methacrylate, ethyl acrylate, butyl acrylate, vinyl acetate, acrylonitrile, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. If desired, the acrylic polymers can be modified by the incorporation of alkyd polymers as well.

Typically, the acrylics are prepared by conventional free radical addition polymerization techniques. If desired, the polymerization can be catalyzed by conventional catalysts known in the art such as azo, peroxy, or redox catalysts. Typically, the acrylic monomers are heated at temperatures ranging from about 180° F. to 400° F. and especially 200° F. to 300° F. to effect the polymerization. It is normally preferred to prepare the polymers by solution polymerization in inert organic solvents.

Representative acrylic lacquers are described in U.S. Pat. No. 4,168,249 and representative acrylic alkyd enamels are described in U.S. Pat. No. 3,844,993. Representative acrylic enamels are taught in U.S. Pat. No. 4,124,551. The teachings of all these patents are hereby incorporated by reference. Commercially available acrylic lacquers include those sold under various trade designations such as, "Pro-Kril" by Acme, a marketing unit of Sherwin-Williams, "Lucite" by the DuPont Co., and "Duracryl" by Ditzler.

Nitrocellulose lacquers are also well known in the art and commercially available nitrocellulose lacquers include those sold under the trade designation "Duco" by DuPont Co.

Thermosetting alkyd or polyester enamels are also well known in the art and can be prepared in a known manner by the condensation of polyhydric alcohols and polycarboxylic acids or anhydrides, with or without the inclusion of natural drying oil fatty acids. The polyesters or alkyds may contain a proportion of free hydroxyl and/or carboxyl groups which are available for reaction, if desired, with suitable crosslinking agents.

Polyurethane vehicles are also well known in the art and can be prepared in a known manner by the reaction of polyhydric alcohols and polyisocyanates. Representative acrylic polyurethane enamels are described in U.S. Pat. No. 3,558,564 the teaching of which is hereby incorporated by reference.

When the vehicle used in combination with the isocyanate functional urethane is a thermosetting vehicle it will typically also contain a crosslinking agent such as a polyisocyanate, which may be blocked, a polyepoxide, or a nitrogen resin such as a condensate of an aldehyde, typically formaldehyde, with a nitrogenous compound such as urea, melamine or benzoguanamine or a lower alkyl ether of such a condensate. If desired, the isocyanate functional urethanes of this invention can be used as the sole crosslinker for thermosetting vehicles or used in combination with a conventional crosslinker.

When the vehicle used in the coating combination with the isocyanate functional urethane is a thermosetting one, the conventional crosslinking agent, for purposes of this invention, is included in the parts by weight calculation to determine the respective amounts of the thermosetting vehicle and the isocyanate functional urethane.

Typically, the level of the isocyanate functional urethane need only be sufficient to provide the required flexibility in the coating composition.

In those cases where the coating composition involves a thermosetting vehicle having functional groups which are reactive with the isocyanate it is usually necessary to add the isocyanate functional urethane of this invention shortly before the application of the coating to minimize the increase of viscosity resulting from the reaction of the isocyanate groups with the reactive groups on the thermosetting vehicle.

Typically, the coating composition will include other additives to adjust the performance and application characteristics of the coating. Normally, the coating composition will include an inert organic solvent typically ranging from 10 to about 90% by weight based upon the total weight of the thermoplastic or thermosetting vehicle and the isocyanate functional urethane. Useful inert solvents for the coating composition include aromatic hydrocarbons such as toluene, xylene, ethyl benzene, aromatic naptha, etc.; aliphatic hydrocarbons such as mineral spirits, hexane, aliphatic naptha, etc.; esters such as butyl acetate, ethylene glycol monoethyl ether acetate, ethylene glycol monobutyl ether acetate, etc.; and ketones such as ethyl amyl ketone, etc.

Typically, the coating composition will also include pigments conventionally used for coating compositions such as titanium dioxide, iron oxide, carbon black, metallic flake pigments such as aluminum flake, organic pigments such as phthalocyanine blue, etc.

The coating may also contain other additives such as flow agents, catalysts, ultra violet light absorbers, etc. The coating may be applied to any substrate, such as metal, plastic, wood, glass, synthetic fibers, etc. by brushing, dipping, roll coating, flow coating, spraying or other method conventionally employed in the coating industry. If desired, the substrate may be primed prior to the application of the coating.

The following examples have been selected to illustrate specific embodiments and practices of advantage to a more complete understanding of the invention.

EXAMPLE I

A reaction vessel equipped with stirrer, thermometer and nitrogen purge was charged with 219.7 parts toluene, 62.36 parts Niax polyol PPG-725 (polypropylene glycol product commercially available from Union Carbide having an average hydroxyl number of 147), 160.37 parts Desmodur N 3390 (90% solids in butyl acetate/aromatic naptha having an isocyanate equivalent weight of approximately 216), 29.0 parts ethylene glycol mono butyl ether and 8.0 grams of dibutyl tin dilaurate. The reaction mixture was maintained under a nitrogen blanket and gradually heated over a period of about 3 hours to 150° F. The reaction was maintained at that temperature for an additional 2 hours yielding an isocyanate functional urethane product having about 5.5% NCO based on solids, and an NVM of about 51%.

One pint of the flexibilizer of this example was added to one gallon of a commercially available acrylic lacquer produced by The Sherwin-Williams Company (Acrylic Lacquer L4W 301, approximately 30% solids by weight; nitrocellulose modified methyl methacrylate/butyl methacrylate acrylic polymer). This coating was applied at a 2.0-2.5 mil dry film thickness over an unprimed thermoplastic urethane substrate and subjected to a variety of conditions then tested for flexibility by deforming the substrate 180° and examining for cracks. The tests results were:

|  | Flexibility After Aging 120° F. Overnight | Flexibility at −10° F. | Flexibility After Heating to 160° F. |
| --- | --- | --- | --- |
| with flexibilizer | pass | pass | pass |
| without flexibilizer | fail | fail | fail |

The additive showed excellent compatability with the acrylic lacquer at this level, which provided an approximate ratio of 60 parts acrylic lacquer vehicle to 40 parts isocyanate functional urethane additive on a weight solids basis.

When added in a volume ratio of about 1:8 the flexibilizing additives of this example also showed excellent compatability and improved flexibility in combination with other commercially available systems including acrylic enamel (Acrylyd ® enamel from The Sherwin-Williams Company; a monomer modified alkyd), and acrylic urethane (Sunfire ® enamel; a hydroxy functional acrylic from The Sherwin-Williams Company crosslinked with Desmodur ® N isocyanate).

EXAMPLE II

An isocyanate functional urethane can be prepared using the procedure of Example I according to the following recipe:

| Raw Material | Chemical Equivalents |
| --- | --- |
| L-2291[1] | 1.3 |
| ethylene glycol | 0.1 |
| triethylene glycol | 0.5 |
| Texanol TA[2] | 0.45 |

[1]biuret of hexamethylene diisocyanate sold by Mobay Company.
[2]2,2,4-trimethyl-1,3-pentanediol monoisobutyrate.

EXAMPLE III

An isocyanate functional urethane may be prepared according to the procedure of Example I according to the following recipe:

| Raw Material | Chemical Equivalents |
| --- | --- |
| L-2291 | 0.3 |
| Desmodur N-3390[3] | 1.0 |
| PPG-425[4] | 0.2 |
| PPG-1025[5] | 0.2 |
| diacetone alcohol | 0.35 |

[3]isocyanurate of hexamethylene diisocyanate sold by Mobay Company.
[4]polypropylene glycol having an average hydroxyl number of 263, sold by Union Carbide Corporation.
[5]polypropylene glycol having an average hydroxyl number of 111, sold by Union Carbide Corporation.

EXAMPLE IV

An isocyanate functional urethane may be prepared according to the procedure of Example I according to the following recipe:

| Raw Materials | Equivalents |
| --- | --- |
| Desmodur N-3390 | 1.0 |
| PPG-725[6] | 0.4 |
| ethyl lactate | 0.4 |

[6]polypropylene glycol having an average hydroxyl number of 147, sold by Union Carbide Corporation.

EXAMPLE V

An isocyanate functional urethane may be prepared according to the procedure of Example I according to the following recipe:

| Raw Materials | Equivalents |
| --- | --- |
| Desmodur N-3390 | 1.0 |
| PPG-725 | 0.3 |
| 2-ethoxy ethanol | 0.2 |
| diacetone alcohol | 0.1 |

Each of the isocyanate functional urethanes of Examples II–V could be combined with a variety of thermoplastic or thermosetting polymeric vehicles to provide improved flexibility.

While this invention has been described by a specific number of embodiments, it is obvious that other variations and modifications may be made without departing from the spirit and scope of the invention as set forth in the appended claims.

The invention claimed is:

1. An isocyanate functional urethane which comprises the reaction product of:
   (a) an aliphatic polyisocyanate having an average of at least 2.1 isocyanate groups per molecule and selected from the group consisting of the biurets and isocyanurates of linear aliphatic diisocyanates; and
   (b) at least one monofunctional alcohol having a molecular weight less than about 500 and which is selected from the group consisting of:

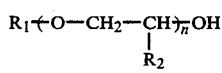

and

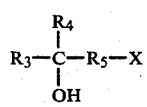

wherein n is from 1 to about 10; $R_1$ is an aliphatic radical of 1 to about 12 carbons; $R_2$ is H or $CH_3$; $R_3$ and $R_4$ are independently aliphatic of 1 to about 12 carbons or H; $R_5$ is an aliphatic radical of 1 to about 8 carbons or nothing;

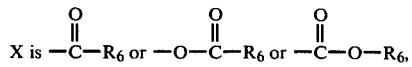

where $R_6$ is an aliphatic radical of 1 to about 12 carbons; and
   (c) at least one diol having the formula:

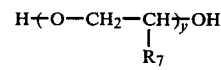

wherein $R_7$ is H or $CH_3$ and y is from 1 to about 40; wherein the total NCO/OH equivalents ratio is greater than 1.0 and the ratio of OH equivalents from (b) to OH equivalents from (c) ranges from 0.3:1 to 2.0:1.0.

2. The urethane of claim 1 further characterized in that the isocyanate functional urethane has an isocyanate equivalent weight ranging from about 280 to about 4200.

3. The urethane of claim 1 further characterized in that the total NCO/OH equivalent ratio is from 1/0.5 to 1/0.99.

4. The urethane of claim 1 further characterized in that the aliphatic polyisocyanate is selected from the group consisting of the biuret of hexamethylene diisocyanate and the isocyanurate of hexamethylene diisocyanate.

5. The urethane of claim 1 further characterized in that the monofunctional alcohol is ethylene glycol mono butyl ether.

6. An isocyanate functional urethane which comprises the reaction product of:
   (a) an aliphatic polyisocyanate selected from the group consisting of the biuret and isocyanurate of hexamethylene diisocyanate; and
   (b) at least one monofunctional alcohol having a molecular weight less than about 500 and having the structure:

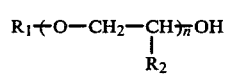

wherein n is from 1 to about 10; $R_1$ is an aliphatic radical of 1 to about 6 carbons; $R_2$ is H or $CH_3$; and
   (c) at least one diol having the formula:

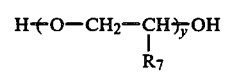

wherein $R_7$ is H or $CH_3$; and y is from 1 to about 40;
   wherein the total NCO/OH equivalents ratio is from 1/0.5 to 1/0.99 and the ratio of OH equivalents from (b) to OH equivalents from (c) ranges from 0.5:1 to 2.0:1.

7. The urethane of claim 6 further characterized in that the isocyanate functional urethane has an isocyanate equivalent weight ranging from about 280 to about 4200.

8. The urethane of claim 6 further characterized in that the monofunctional alcohol is ethylene glycol mono butyl ether.